(12) United States Patent
Imaizumi

(10) Patent No.: US 7,155,750 B2
(45) Date of Patent: Jan. 2, 2007

(54) FILTERING APPARATUS OF CIRCULATING FLUSH TOILET

(75) Inventor: Shunichi Imaizumi, Gunma (JP)

(73) Assignee: Nakatomi Industrial Co., Ltd., Ota-shi (JP)

( * ) Notice: Subject to any disclaimer, the term of this patent is extended or adjusted under 35 U.S.C. 154(b) by 323 days.

(21) Appl. No.: 10/901,129

(22) Filed: Jul. 29, 2004

(65) Prior Publication Data

US 2005/0028261 A1 Feb. 10, 2005

(51) Int. Cl.
*E03D 5/016* (2006.01)
(52) U.S. Cl. .......................................... 4/318; 210/167
(58) Field of Classification Search ............ 4/317–318; 210/167
See application file for complete search history.

(56) References Cited

U.S. PATENT DOCUMENTS 3,633,218 A * 1/1972 Lekberg .................. 210/242.2
3,675,774 A * 7/1972 Roberts et al. ............. 210/167
3,950,249 A * 4/1976 Eger et al. .................. 210/104
6,412,121 B1 * 7/2002 Motoyama ..................... 4/318

FOREIGN PATENT DOCUMENTS

JP 2002-339429 A 11/2002
JP 2003-105025 A 4/2003

* cited by examiner

*Primary Examiner*—Charles E. Phillips
(74) *Attorney, Agent, or Firm*—Birch, Stewart, Kolasch & Birch, LLP

(57) ABSTRACT

A filtering apparatus of a circulating flush toilet recycling drain water having used for washing the inside a toilet bowl is disposed between a water-receiving tank and a water-pumping tank of the flush toilet so as to solve problems such as clogging of a pipe and a pump failure. The filtering apparatus includes a casing, a toothed gate formed in a part of the casing, close to the water-receiving tank, and a filtering unit which filters water overflown from the water-receiving tank and passing through the gate, in multiple stages, and which causes the filtered drain water to flow into the water-pumping tank.

2 Claims, 6 Drawing Sheets

(a)

(b)

FILTERING APPARATUS OF CIRCULATING FLUSH TOILET

BACKGROUND OF THE INVENTION

1. Field of the Invention

The present invention relates to a filtering apparatus of a circulating flush toilet, and more particularly, the present invention relates to a filtering apparatus of a circulating flush toilet, which effectively filters wastes in multiple stages contained in drain water having used for washing the inside of a toilet bowl.

2. Description of the Related Art

Hitherto, in a circulating flush toilet recycling drain water having used for washing the inside a toilet bowl, water having used for washing the inside of a toilet bowl is not discharged outside but is reused while being circulated in the toilet. As a result, the flush toilet has advantages in that an amount of consumed tap water can be reduced, and also a sewage installation can be eliminated. On the other hand, the flush toilet has a problem of foul water when its capacity of processing circulating water is decreased during operation or the number of frequencies of its usages increases. In order to solve such a problem, the inventor of the application has previously proposed a water-circulating apparatus of a flush toilet, which effectively purifies and circulates water used in the flush toilet so as to drastically decrease an amount of consumed tap water and also to lessen a burden of sewage processing (for example, see Japanese Unexamined Patent Application Publication No. 2002-339429, pages 2 and 3, and FIG. 1 (hereinafter, simply referred to as a patent document)).

The water-circulating apparatus of a flush toilet disclosed in the patent document includes a lower tank pooling drain water discharged from a toilet bowl; an aerating tank causing the drain water pumped from the lower tank to be aerated by a blower pump; a first separating tank pooling the drain water conveyed from the aerating tank and separating the drain water into clean water and sludge; an airlift pump discharging the sludge precipitated in the first separating tank into a sewage system; a second separating tank pooling the clean water conveyed from the upper part of the first separating tank and also separating it into clean water and sludge; and another airlift pump discharging the sludge in the second separating tank into the sewage system. With this structure, an amount of consumed tap water can be drastically reduced, a burden of sewage processing can be lessened, and also, an output of processed circulating water is increased, thereby contributing to an improved sanitary aspect.

However, in many circulating flush toilets including that disclosed in the above patent document, since a user often discards a sheet of commercially available tissue paper, a cigarette butt, and/or the like in a toilet bowl, such wastes are stored in the lower tank pooling drain water, and expand because of absorbing water, accordingly causing a problem of clogging of a pipe, a pump failure, or the like, and hence the wastes stored in the lower tank must be periodically removed.

SUMMARY OF THE INVENTION

Accordingly, it is an object of the present invention to provide a filtering apparatus of a circulating flush toilet so as to solve problems such as clogging of a pipe and a pump failure.

In order to achieve the above object, a filtering apparatus of a circulating flush toilet recycling drain water having used for washing the inside a toilet bowl, according to the present invention, disposed between a water-receiving tank and a water-pumping tank of the circulating flush toilet, includes a casing; a toothed gate formed in a part of the casing close to the water-receiving tank; and a filtering unit which filters water overflown from the receiving tank and passing through the gate in multiple stages in the casing and which causes the filtered drain water to flow into the water-pumping tank. Thus, wastes such as a cigarette butt contained in drain water conveyed from a toilet bowl are firstly blocked by the gate and are then effectively filtered by the filtering unit in multiple stages. As a result, problems of the circulating flush toilet such as clogging of a pipe and a pump failure can be solved.

Also, in the filtering apparatus according to the present invention, the filtering unit is preferably formed by (i) a base plate having at least two perforations formed therein; (ii) baskets fit into the corresponding perforations; and (iii) filter lids, each filter lid disposed on the corresponding basket and including a mesh portion and a rising portion. With this structure, the basket and the filter lid of the filtering unit filled with wastes are easily replaced with new ones.

BRIEF DESCRIPTION OF THE DRAWINGS

FIG. 2 is a perspective view of the filtering apparatus, wherein FIGS. 2A and 2B illustrate the filtering apparatus, viewed from one side and another side, respectively;

DESCRIPTION OF THE PREFERRED EMBODIMENTS

With reference to the attached drawings, a filtering apparatus of a circulating flush toilet according to an embodiment of the present invention will be described in detail.

A filtering apparatus 1 according to the present invention is disposed between a water-receiving tank and a water-pumping tank of a circulating flush toilet recycling drain water having used for washing the inside of a toilet bowl so as to solve problems such as clogging of a pipe and a pump failure caused by wastes contained in the drain water, by filtering the wastes in multiple stages.

Figure 3:
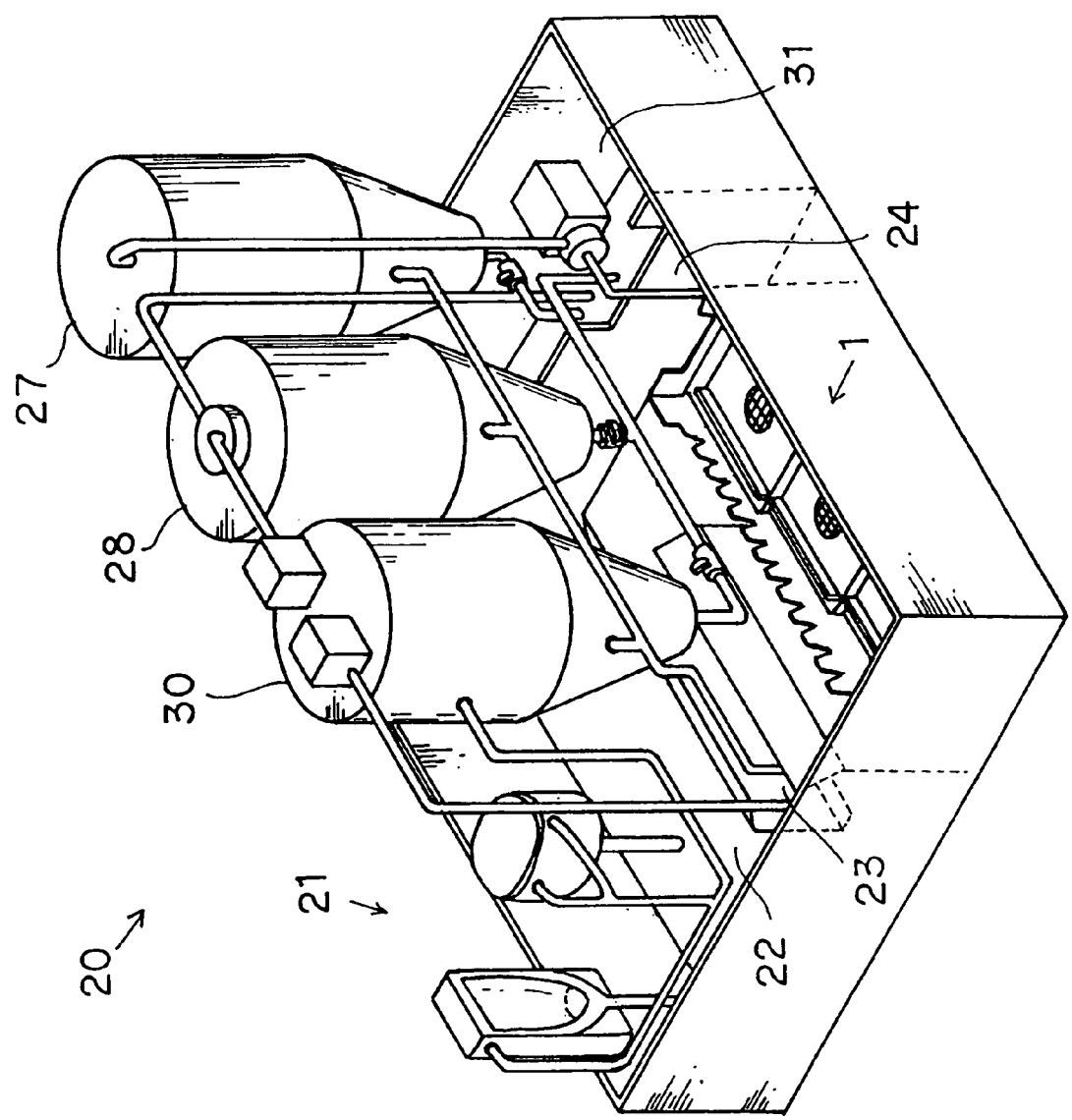
FIG. 3 is a perspective view of the overall circulating flush toilet including the filtering apparatus.
Figure 7:
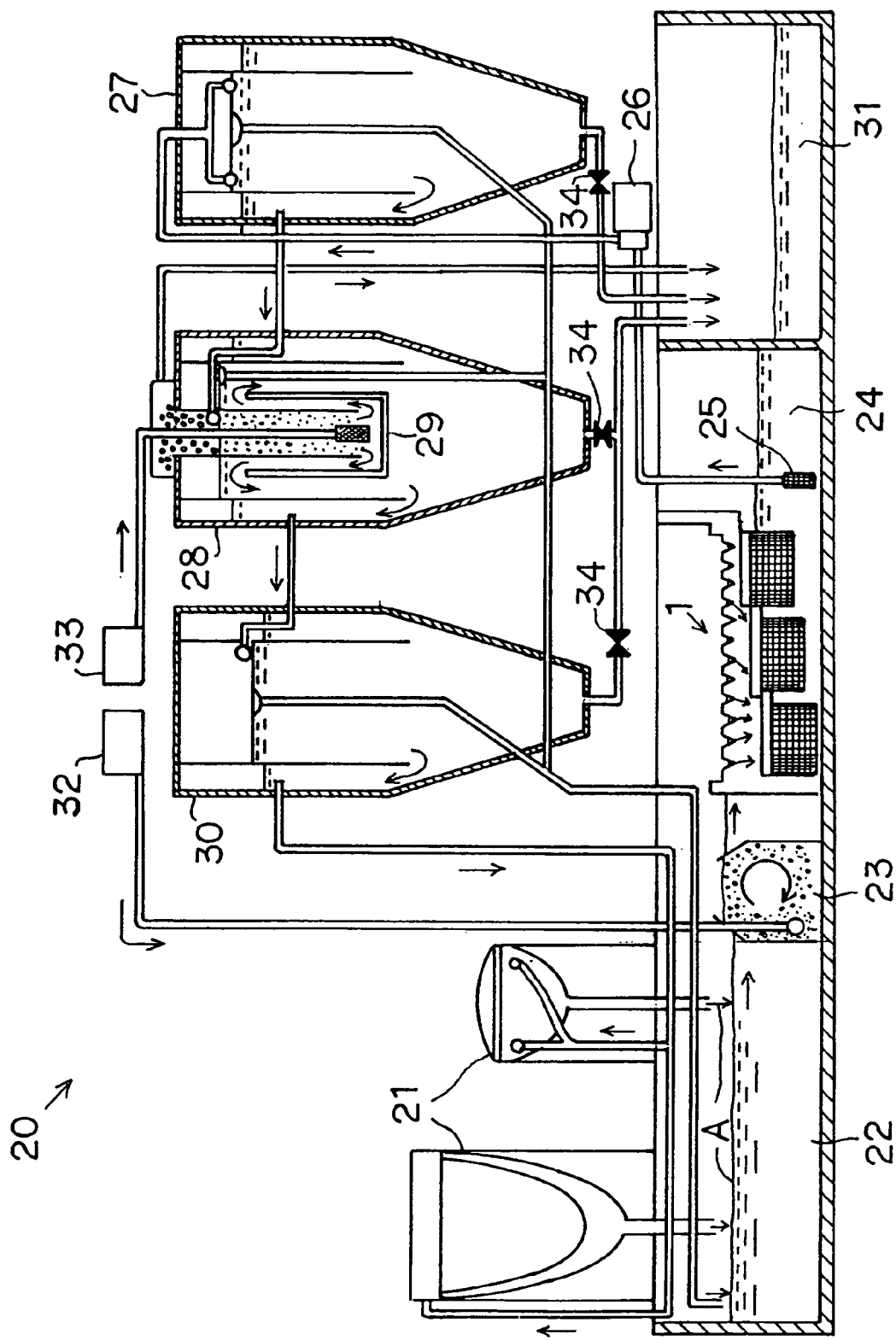
FIG. 7 is a sectional view of the circulating flush toilet, illustrating a series of filtering states of the same.

Referring now to FIGS. 3 and 7, a circulating flush toilet 20 in which the filtering apparatus 1 according to the preferred embodiment of the present invention is installed will be described in detail. Meanwhile, the circulating flush toilet 20 is not limited to that shown in the figure. The filtering apparatus according to the present invention is applicable to any circulating flush toilet recycling drain water having used for washing the inside of a toilet bowl as long as the toilet has a water-receiving tank and a water-pumping tank installed therein.

The circulating flush toilet 20 shown in the figure includes a water-receiving tank 22 pooling drain water having washed a toilet bowl 21, an aerator 23 aerating the drain water in the water-receiving tank 22 by bringing it contact with air, and a water-pumping tank 24. The aerator 23 aerates the drain water by blowing air into the drain water from a blower 32. Although the filtering apparatus 1 according to the present invention is generally disposed between the water-receiving tank 22 and the water-pumping tank 24, in the circulating flush toilet 20 shown in the figure, the filtering apparatus 1 is disposed between the aerator 23 in the water-receiving tank 22 and the water-pumping tank 24. The drain water from the aerator 23 disposed in the water-receiving tank 22 flows into the water-pumping tank 24, passing through the filtering apparatus 1.

The drain water pumped from the water-pumping tank 24 is sequentially conveyed to a rotationally separating tank 27 separating the drain water into water and wastes from each other by rotating them, a separating tank 28 further purifying the drain water purified by the rotationally separating tank 27, and a water-conveying and settling tank 30 pooling the drain water purified by the separating tank 28 and conveys it to the toilet bowl 21 in that order. The separating tank 28 purifies the drain water by blowing air into the drain water from a blower 33. Meanwhile, purified water in the rotationally separating tank 27, the separating tank 28, and the water-conveying and settling tank 30 is conveyed to the water-receiving tank 22 as needed, and also, drain water stored in the bottoms of the same is conveyed to a storage tank 31 as needed by manually opening respective valves 34. The drain water stored in the storage tank 31 is not recycled by the circulating flush toilet 20 but is discarded as needed. Although not shown in the figure, water can be replenished to the circulating flush toilet 20 from outside if needed.

Figure 1:
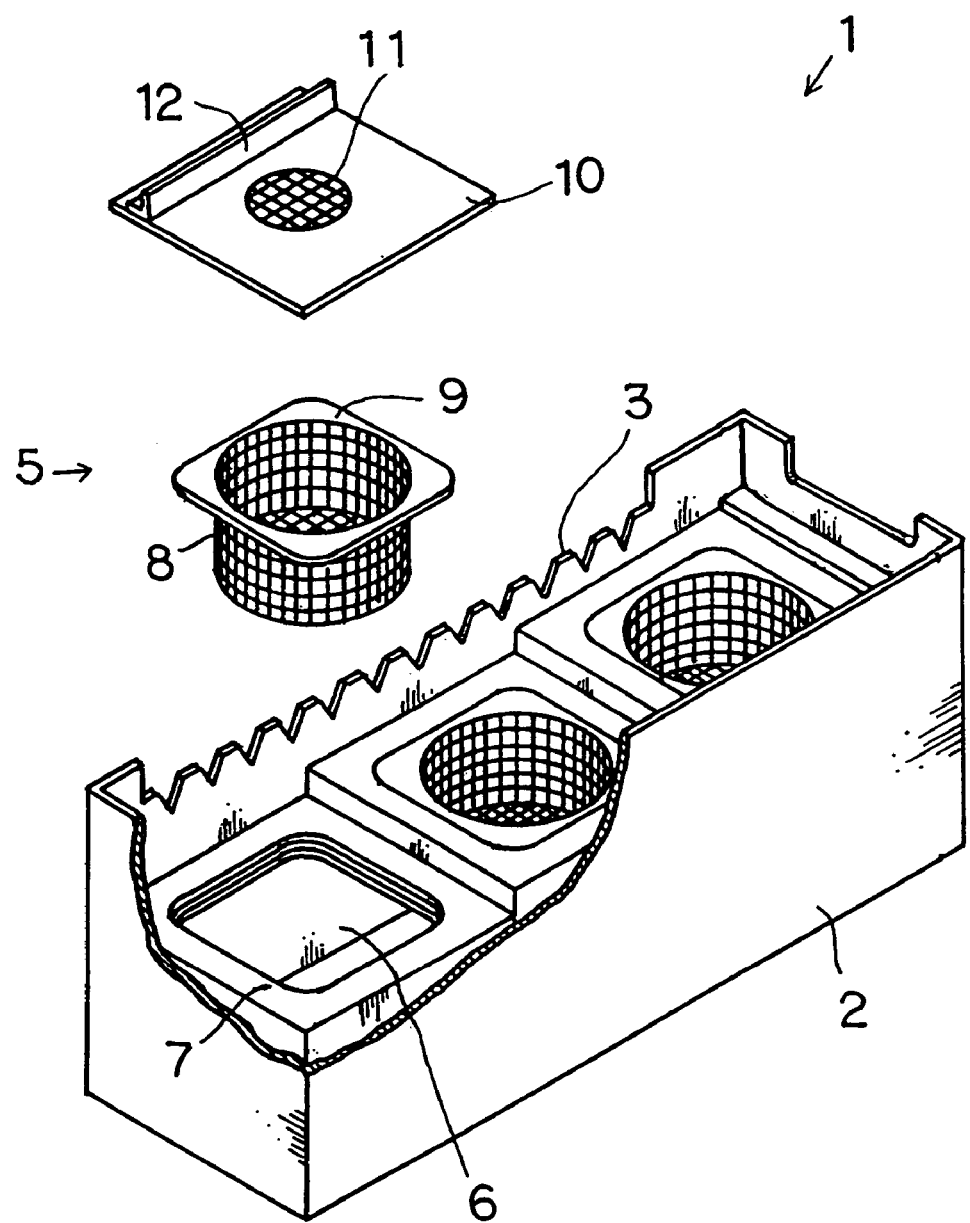
FIG. 1 is an exploded perspective view of a filtering apparatus of a circulating flush toilet according to an embodiment of the present invention, a part of the filtering apparatus being cut away.
Figure 2:
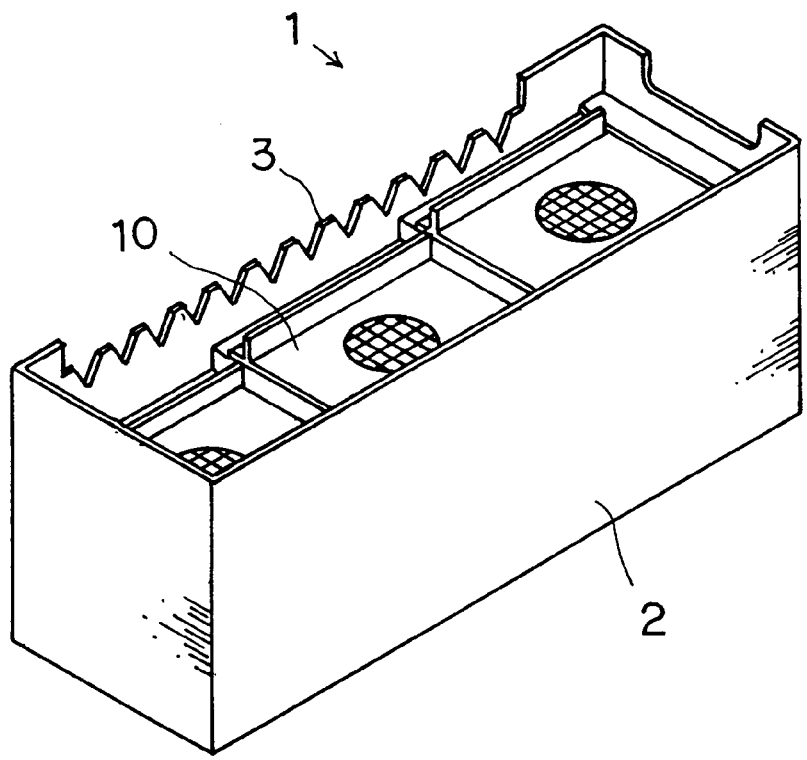
Figure 2:
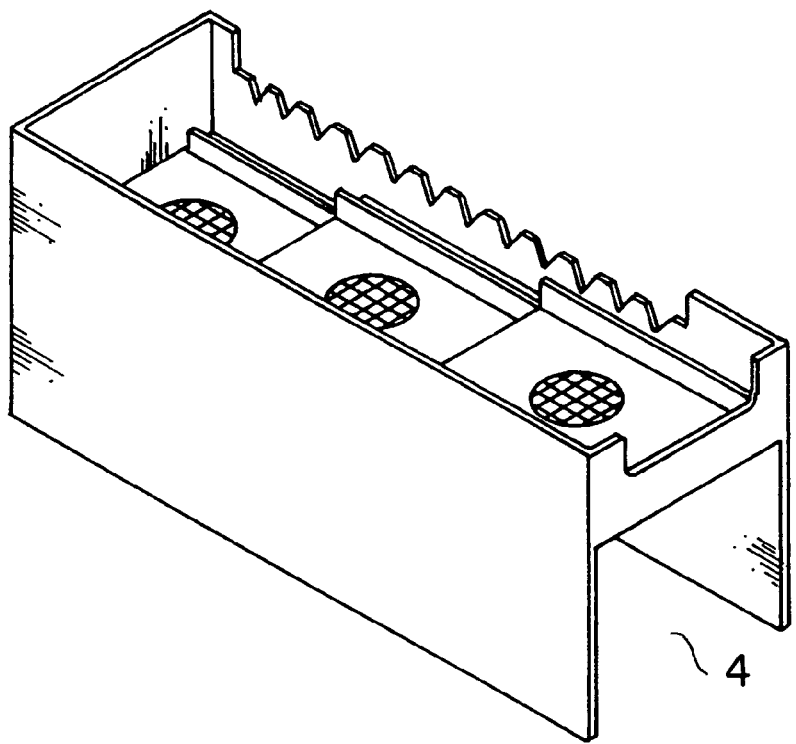

As shown in FIGS. 1 and 2, the filtering apparatus 1 according to the present invention installed between the water-receiving tank 22 and the water-pumping tank 24 of the circulating flush toilet 20 has a casing 2, a toothed gate 3 formed at the upper part of one sidewall of the casing 2 close to the water-receiving tank 22, and a filtering unit 5 disposed in the upper part of the casing 2 in multiple stages.

The casing 2 shown in the figure has a long box shape and is composed of rustproof material such as a stainless steel. The gate 3 formed in the one sidewall of the casing 2 has a saw-toothed shape formed by a plurality of projections and depressions and lies slightly lower than the top of another sidewall of the casing 2, opposed to the one sidewall. With this structure, When drain water A containing wastes a is conveyed from the toilet bowl 21 to the gate 3 (see FIG. 6), bulky wastes are previously blocked by the projections of the gate 3. Also, the casing 2 has an opening 4 formed in another sidewall thereof, for conveying the drain water A to the water-pumping tank 24 (see FIG. 2B).

Also, the casing 2 has the filtering unit 5 disposed in the upper part thereof in multiple stages (in three stages in the preferred embodiment shown in the figure). As shown in FIG. 1, the filtering unit 5 is formed by (i) a base plate 7 having at least two perforations 6 formed therein; (ii) baskets 8, each fitted into the corresponding perforation 6 and having a holding plate 9; and (iii) filter lids 10, each filter lid disposed on the corresponding basket 8 and formed by a meshed portion 11 and a rising portion 12. The rising portions 12 of the filter lids 10 are arranged in a line so as to form a flow path of drain water.

Figure 4:
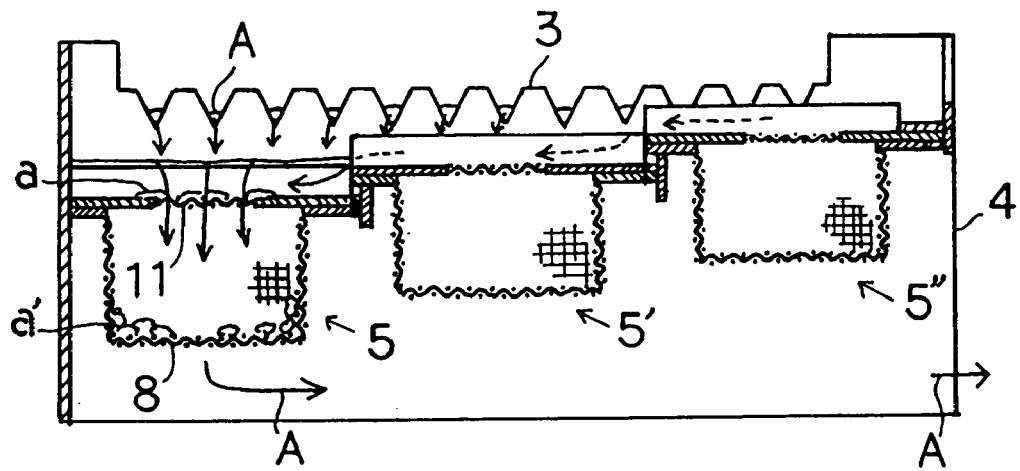
FIG. 4 is a side sectional view of the filtering apparatus according to the present invention, illustrating a filtering state of the same.
Figure 5:
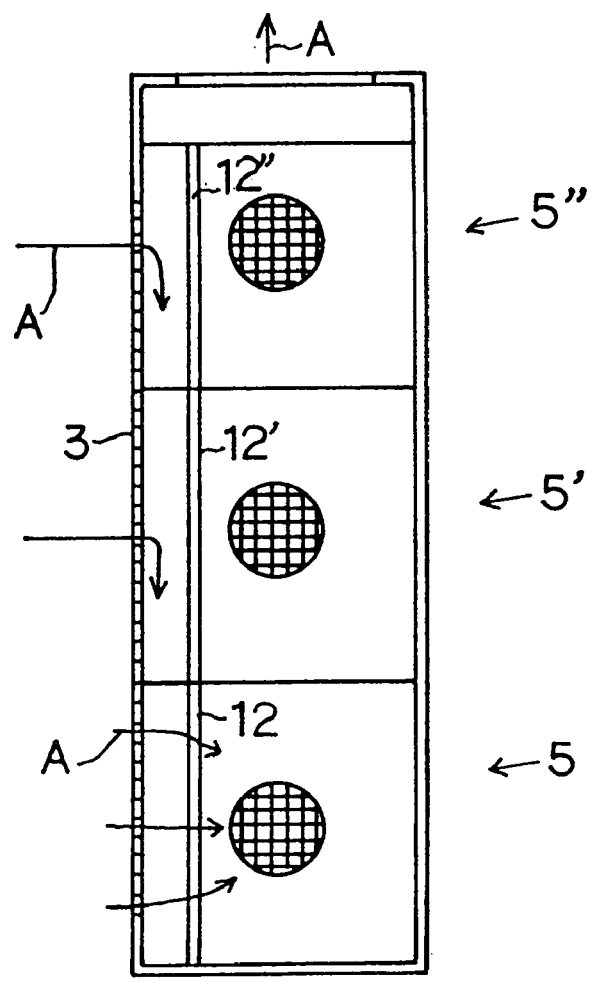
FIG. 5 is a plan view of the filtering apparatus.

As shown in FIGS. 4 and 5, since subunits of the filtering unit 5 (in FIGS. 4 and 5, represented by reference numbers 5, 5' and 5") are disposed at respectively appropriate heights in the upper part of the casing 2 in multiple stages (in three stages in the figure), due to overflown water from the gate 3, drain water A containing wastes a flows first along rising portions 12' and 12" of the respective subunits of filtering unit 5, formed in the upper part of the casing 2 and is brought into the first filtering subunit 5 formed at the lower part of the casing 2. Bulky wastes a contained in the drain water A brought in the first filtering subunit 5 are blocked by the meshed portion 11 of the corresponding filter lid 10, and a part of the drain water containing small wastes a' is brought into the corresponding basket 8. On this occasion, the small wastes a' are held by the basket 8, and the drain water A without wastes is conveyed to a lower part of the casing 2 and flows into the water-pumping tank 24 through the opening 4.

Figure 6:
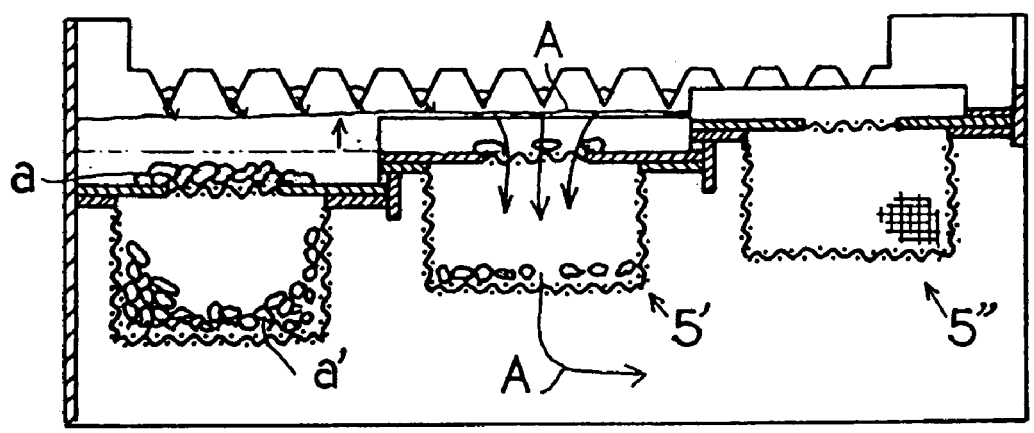
FIG. 6 is a side sectional view of the filtering apparatus, illustrating a filtering state of the same in multiple stages.

When the meshed portion 11 of the first filtering subunit 5 is blocked by bulky wastes a, and drain water overflows accordingly from the first filtering subunit 5, as shown in FIG. 6, the drain water is raised and flows into the second filtering subunit 5', and wastes a contained in the drain water are filtered by the second filtering subunit 5'. In addition, when the second filtering unit 5' is blocked by wastes, and drain water overflows from the second filtering subunit 5', the drain water is raised and flows into the third filtering subunit 5'. According to the present invention, drain water is filtered in multiple stages, thereby improving a filtering efficiency of the circulating flush toilet 20 and solving problems of clogging of a pipe and a pump failure of the same caused by wastes. Although the filtering unit 5 is formed in three stages in the figure, the present invention is not limited to a structure of three stages. Preferably, the number of stages is changed in accordance with a level of impurity.

Since the filtering unit has a structure as mentioned above, when any one of the filtering subunits 5, 5', and 5" is blocked by wastes a, the filtering subunit can be easily repaired simply by detaching the filter lid 10 and the basket 8 from the corresponding base plate 7 and by attaching previously prepared filter lid 10 and basket 8 to the base plate 7, thereby improving a working efficiency.

Referring now to FIG. 7, a series of filtering states performed by the circulating flush toilet 20 including the filtering apparatus 1 according to the present invention will be described.

The inside of the toilet bowl 21 is washed by purified water conveyed from the water-conveying and settling tank 30, and drain water A having washed the toilet bowl 21 is conveyed to the water-receiving tank 22. The drain water A in the water-receiving tank 22 is brought into contact with air blown from the blower 32 and is aerated by the aerator 23.

The aerated drain water A flows into the filtering apparatus 1 from the gate 3, and the drain water A containing wastes a is filtered in multiple stages. The filtered drain water A is pumped up to the rotationally separating tank 27 by a ball foot valve 25 in the water-pumping tank 24, having a magnetic pump 26 interposed therebetween. Then, water from which wastes have been removed in the rotationally separating tank 27 is conveyed to the separating tank 28 and is purified by a protein filter 29 with air blown from the blower 33.

Subsequently, the water purified by the separating tank 28 is conveyed to the water-conveying and settling tank 30, and the purified water in the water-conveying and settling tank 30 is reused for washing the toilet bowl 21.

What is claimed is:

1. A filtering apparatus of a circulating flush toilet recycling drain water having used for washing the inside of a toilet bowl, the apparatus being disposed between a water-receiving tank and a water-pumping tank of the circulating flush toilet, comprising:
   a casing;
   a toothed gate formed in a part of the casing close to the water-receiving tank; and
   a filtering unit which filters water overflown from the receiving tank and passing through the gate, in multiple stages, in the casing and which causes the filtered drain water to flow into the water-pumping tank.

2. The filtering apparatus of a filtering apparatus of a circulating flush toilet according to claim 1, wherein the filtering unit comprises a base plate having at least two perforations formed therein; baskets fit into the corresponding perforations; and filter lids disposed on the corresponding baskets, each filter lid including a mesh portion and a rising portion.

* * * * *